(12) United States Patent
Lee

(10) Patent No.: US 10,495,532 B2
(45) Date of Patent: Dec. 3, 2019

(54) OPTICAL FIBER SENSING METHOD

(71) Applicant: National Applied Research Laboratories, Taipei (TW)

(72) Inventor: Zheng-Kuan Lee, Taipei (TW)

(73) Assignee: NATIONAL APPLIED RESEARCH LABORATORIES, Taipei (TW)

( * ) Notice: Subject to any disclaimer, the term of this patent is extended or adjusted under 35 U.S.C. 154(b) by 0 days.

(21) Appl. No.: 15/985,064

(22) Filed: May 21, 2018

(65) Prior Publication Data

US 2019/0078948 A1 Mar. 14, 2019

(30) Foreign Application Priority Data

Sep. 13, 2017 (TW) .............................. 106131362 A

(51) Int. Cl.
*G01L 1/24* (2006.01)
*G01L 5/10* (2006.01)
*G02B 6/02* (2006.01)

(52) U.S. Cl.
CPC .............. *G01L 1/246* (2013.01); *G01L 5/105* (2013.01); *G02B 6/02076* (2013.01)

(58) Field of Classification Search
CPC ....... G01L 1/246; G01L 5/0033; G01L 5/105; G01B 11/18; G01B 6/02076; G01C 5/04; G01C 9/22; G01M 5/0008; G01M 5/005; G01M 11/083
USPC ................................................... 73/862.624
See application file for complete search history.

(56) References Cited

U.S. PATENT DOCUMENTS

| 9,183,739 B2 | 11/2015 | Lee |
| 9,581,522 B2 * | 2/2017 | Su ........................... G01M 11/00 |
| 9,945,667 B2 * | 4/2018 | Li ........................ G01D 5/35345 |
| 2002/0050578 A1 * | 5/2002 | Yashiro ............... G01F 23/0038 250/573 |

(Continued)

FOREIGN PATENT DOCUMENTS

| CN | 102607523 A | 7/2012 |
| CN | 105783866 A | 7/2016 |
| JP | 2014-10148 A | 1/2014 |

(Continued)

OTHER PUBLICATIONS

European Patent Office, Search Report, dated Feb. 5, 2019, 14 pages.

*Primary Examiner* — Octavia Hollington
(74) *Attorney, Agent, or Firm* — Muncy, Geissler, Olds & Lowe, P.C.

(57) ABSTRACT

The optical fiber sensing method of the present invention includes steps of: joining heat shrinkable tubes to two ends of a sensing segment of an optical fiber; coupling a fixing element on the heat shrinkable tube below the sensing segment; detachably connecting at least one floating element to the fixing element; placing the floating element into a fluid; and providing an input signal to the sensing segment and generating an output signal after the input signal is processed by the sensing segment, wherein the tensile force applied to the sensing segment would change with variation of the buoyant force upon the floating element, resulting in change of the output signal. Accordingly, the optical fiber sensing method has numerous advantages, including rapid on-site construction, recyclability of components and changeability of design parameters.

13 Claims, 11 Drawing Sheets

(56) References Cited

U.S. PATENT DOCUMENTS

2017/0322024 A1   11/2017   Li

FOREIGN PATENT DOCUMENTS

| JP | 2016-531294 A | 10/2016 |
| TW | I598567 B | 9/2017 |
| TW | I598567 B | 9/2017 |

* cited by examiner

OPTICAL FIBER SENSING METHOD

CROSS REFERENCE TO RELATED APPLICATION

This application claims the benefits of the Taiwan Patent Application Serial Number 106131362, filed on Sep. 13, 2017, the subject matter of which is incorporated herein by reference.

BACKGROUND OF THE INVENTION

1. Field of the Invention

The present invention relates to an optical fiber sensing method and, more particularly, to an optical fiber sensing method by which components are recyclable and parameters are alterable.

2. Description of Related Art

In recent years, disasters took place in many countries, which not only threaten people's life and properties but also may affect the country's economy. Therefore, instantly monitoring the conditions about the environment and buildings and early warning become important issues to reduce the impact caused by disasters. Particularly, by monitoring the conditions of environment and buildings before the disaster, appropriate emergency measures can be immediately taken so as to reduce life and property damages caused by disasters. Additionally, the information obtained by monitoring the environment and buildings can also serve as the basis for post-disaster reconstruction to accelerate post-disaster reconstruction.

In the past, the safety inspection of the environment or the buildings usually was simply conducted only over a particular period of time. As the environment and the buildings were not monitored continuously, their daily variation cannot be observed in real time. This causes that reinforcements or maintenance cannot be made appropriately and even early warnings cannot be issued before disasters. Nowadays, various sensing methods and devices for safety monitoring have been developed with the advance of technology, and thus the safety of the environment and the buildings can be inspected in real time.

However, many conventional sensing methods and devices have not been widely applied yet due to their disadvantages, such as difficulty in on-site construction, high cost, unchangeable system parameters, non-recyclability, or short service life.

SUMMARY OF THE INVENTION

One objective of the present invention is to provide an optical fiber sensing method and device, which are advantageous of easy on-site construction, recyclability of components, changeability of design parameters, low cost, easy maintenance and long service life. The sensing method or device may be applied in monitoring the inclination or settlement of the environment or structures (such as buildings, bridges, roads) to instantly ensure the safety of the environment and the structures.

In order to achieve the aforementioned objective, the present invention provides an optical fiber sensing method, including: (a) providing an optical fiber measuring unit, a plurality of heat shrinkable tubes and at least one fixing element, wherein the heat shrinkable tubes are fastened on an optical fiber of the optical fiber measuring unit, the optical fiber has at least one sensing segment, the heat shrinkable tubes are sleeved and fastened on an upper end and a lower end of the sensing segment, respectively, and the fixing element is sleeved and fastened on the heat shrinkable tube at the lower end of the sensing segment; (b) detachably connecting at least one floating element to the fixing element, so that the floating element provides tensile force on the corresponding sensing segment thereof; (c) placing the at least one floating element at the lower end of the sensing segment into a fluid, so that the fluid provides buoyant force on the at least one floating element; and (d) driving the optical fiber measuring unit to provide an input signal to the sensing segment and generating an output signal after the input signal is processed by the sensing segment, wherein the tensile force applied to the sensing segment would change with variation of the buoyant force on the floating element, resulting in change of the output signal. After completing the monitoring, the optical fiber can be cut, and the floating element may be detached from the fixing element so as to recycle sensing components. The recycled sensing components can be used in the next monitoring procedure by repeating the aforementioned steps (b) to (d). Further, the fixing element may be assembled with new floating elements for new parameters required in the next monitoring procedure.

Additionally, the present invention further provides an optical fiber sensing system, including: an optical fiber measuring unit; a plurality of heat shrinkable tubes fastened on an optical fiber of the optical fiber measuring unit, wherein the optical fiber has at least one sensing segment, and the heat shrinkable tubes are sleeved and fastened at an upper end and a lower end of the sensing segment, respectively; a fixing element sleeved and fastened on the heat shrinkable tube at the lower end of the sensing segment; and at least one floating element detachably connected to the fixing element and proving tensile force on the sensing segment of the optical fiber, wherein the tensile force applied to the sensing segment would change with variation of the buoyant force on the at least one floating element placed in a fluid.

In the present invention, the shapes and the materials of the fixing element and the floating elements and the manner for detachably assembling the fixing element with the floating element are not particularly limited as long as quick assembly/disassembly requirements can be achieved. For instance, the fixing element and the floating element may have a first connecting portion and a second connecting portion, respectively. The first connecting portion and the second connecting portion can be assembled with and detached from each other. Specifically, the first connecting portion and the second connecting portion can be provided at the lateral surface of the fixing element and the lateral surface of the floating element, respectively. As a result, the floating element can be connected to the first connecting portion at the lateral surface of the fixing element through its second connecting portion. As an example, at least one lateral surface of the fixing element may be provided with a first magnetic portion as the first connecting portion, whereas one lateral surface of the floating element can be provided with a second magnetic portion as the second connecting portion. Accordingly, one or more floating elements can be attracted on and fastened to the fixing element through the magnetic force between the first connecting portion and the second connecting portion. Additionally, in accordance with one preferred embodiment of the present invention, the floating element is configured to include a bump and a main body. The bump is integral with the main body and projects from one lateral surface of the main body. Further, the bump has the second connecting portion at one lateral surface thereof, and the first connecting portion of the fixing element has a vertical segment and a horizontal segment. The vertical segment is detachably connected to the second connecting portion of the bump, whereas the horizontal segment laterally projects from the vertical segment and supports the bottom surface of the bump. Accordingly, the main body of the floating element can be spaced from the fixing element with a predetermined distance by the bump having smaller lateral width so as to avoid the assembly interference caused by coupling a plurality of floating elements on the fixing element. As an alternative, the at least on floating element may be detachably connected to the fixing element through a spacer. The shape and material of the spacer are not particularly limited. The spacer can have a third connecting portion and a fourth connecting portion at its opposite ends, respectively. The third connecting portion of the spacer can be connected to the first connecting element of the fixing element, whereas the fourth connecting portion of the spacer can be connected to the second connecting element of the floating element. As exemplified above, magnetic force can provide the connections between the first connecting portion and the third connecting portion and between the second connecting portion and the fourth connecting portion. Accordingly, the modularity design of the present invention is advantageous to rapid on-site instrument construction, individual replacement of damaged components, easy maintenance and reduced maintenance cost. Additionally, after completing the monitoring, the components of the sensing system can be disassembled and recycled. Further, the device parameters can be easily altered according to requirements of the next monitoring procedure. For instance, the quantity or size of the floating elements assembled on the fixing element can be altered.

In the present invention, the optical fiber sensing method and system can be applied in sensing the movement of the monitored subject (such as change in difference of elevation). When the movement of the monitored subject induces change in the buoyant force applied to the floating element, the variation of output signal can be observed so as to detect the movement of the monitored subject. The optical fiber sensing system may further include a container for accommodating the fluid, and the fixing element at the upper end of the sensing segment can be fastened to the container, with the floating element below the sensing segment being immersed into the fluid in the container. More specifically, when the container is installed to a monitored subject (such as a structure), the movement of the monitored subject can be detected by observation of variation in tensile force applied to the sensing segment.

In the present invention, the optical fiber can have a plurality of sensing segments, and the container may have a plurality of accommodating portions and at least one connecting pipe. The accommodating portions communicate with each other through the connecting pipe. As a result, the liquid levels of the fluid in the accommodating portions can be maintained at the same level based on communicating pipe principle, and the fluid in the accommodating portion would affect its corresponding floating element and its corresponding sensing segment. Accordingly, an optical fiber sensing system is configured to include a plurality of accommodating portions, at least one connecting pipe, a plurality of sensing segments, a plurality of heat shrinkable tubes, a plurality of fixing elements and a plurality of floating elements, and can be used for detecting abnormal conditions (such as inclination or settlement) of the monitored subject (such as bridges, buildings or roads). Each accommodating portion is configured to correspond to a sensing module, and each sensing module includes a sensing segment, a plurality of heat shrinkable tubes, at least one fixing element and at least one floating element. In the present invention, the accommodating portions and the sensing modules are not particularly limited in quantity. A predetermined number of the accommodating portions and the sensing modules can be disposed according to requirement. More specifically, when the accommodating portions are disposed on a structure and spaced from each other with a predetermined distance, the inclination or settlement of the monitored subject would induce change in the relative vertical positions of the accommodating portions, resulting in difference of the liquid levels between the accommodating portions. Consequently, the fluid would flow toward the accommodating portion at the lower position based on communicating pipe principle until the liquid levels of all the accommodating portions become the same. For the accommodating portion at the lower position, because the buoyant force applied to its floating element increases, the tensile force applied on its corresponding sensing segment would decrease. On the contrary, the buoyant force applied to the floating element in the accommodating portion at the higher position would decrease, leading to increase in the tensile force applied on its corresponding sensing segment. Accordingly, the variation of output signal can be observed when inclination or settlement of the monitored subject occurs.

In the present invention, the sensing segment of the optical fiber measuring unit vertically extends above the liquid surface of the fluid, and may be a fiber bragg grating (FBG). When the sensing segment is forced to deformation in length direction, the grating period would change. Accordingly, the deformation of the sensing segment can be detected by observation of the signal change caused by variation of grating period so as to determine the physical parameters regarding the condition of the monitored subject (such as inclination or settlement).

In the present invention, an additional fixing element may be further provided to be sleeved and fastened on the heat shrinkable tube at the upper end of the sensing segment. Additionally, the container can further include at least one covering plate for sealing the top opening of each accommodating portion and supporting the fixing element above the sensing segment so as to provide tensile force on the grating and reduce evaporation of the fluid. More specifically, the covering plate can have a trench to permit the optical fiber to vertically extend into the interior of the accommodating portion. In order to avoid displacement of the upper fixing element, the covering plate may further have a limiting structure that conforms to the four lateral sides of the upper fixing element so that the fixing element disposed across the trench of the covering plate can be confined at the predetermined location. Accordingly, the fixing element above the sensing segment can be fastened to the container through the covering plate, and the upper end of the sensing segment can be secured to the container through the fixing element and the covering plate.

In the present invention, the optical fiber measuring unit can include the aforementioned optical fiber, an optical module and a signal processing module. The optical module is configured to emit an input signal into the optical fiber. After the input signal is processed by the sensing segment, an output signal is generated and transmitted to the optical module. The signal processing module is capable of analyzing the output signal to obtain a physical parameter.

In the present invention, the signal processing module may transmit the obtained physical parameters to a receiving terminal through the wireless or wired transmission. Also, for achieving the warning function, the signal processing module may further generate a warning message, such as SMS, email, or voice message, to the receiving terminal for informing the supervisor when the physical parameter exceeds the preset limit.

The foregoing and other objects, advantages, and novel features of the invention will become more apparent from the following detailed description when taken in conjunction with the accompanying drawings.

DETAILED DESCRIPTION OF THE PREFERRED EMBODIMENT

Hereafter, examples will be provided to illustrate the embodiments of the present invention. Advantages and effects of the invention will become more apparent from the disclosure of the present invention. It should be noted that these accompanying figures are simplified and illustrative. The quantity, shape and size of components shown in the figures may be modified according to practical conditions, and the arrangement of components may be more complex. Other various aspects also may be practiced or applied in the invention, and various modifications and variations can be made without departing from the spirit of the invention based on various concepts and applications.

Figure 1:
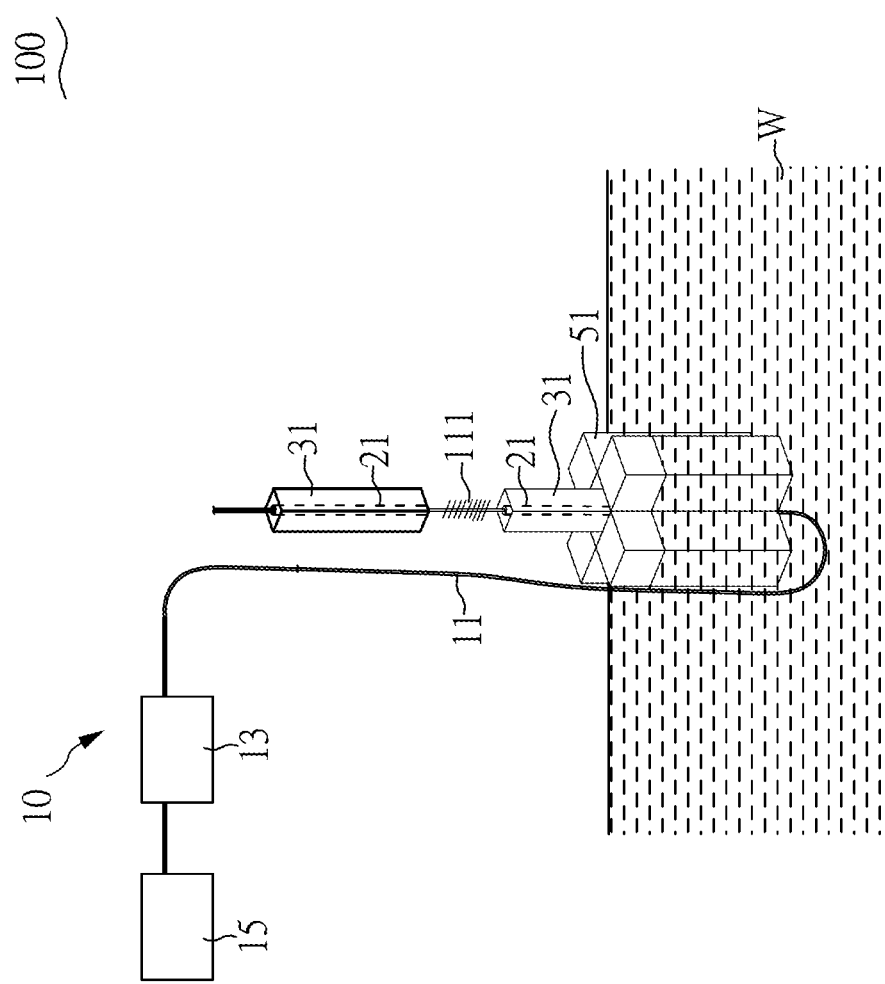
FIG. 1 is a perspective view of an optical fiber sensing system in accordance with one embodiment of the present invention.

Please refer to FIG. 1, which shows a perspective view of an optical fiber sensing system 100 in accordance with one embodiment of the present invention. As illustrated in FIG. 1, the optical fiber sensing system 100 of this embodiment includes an optical fiber measuring unit 10, heat shrinkable tubes 21, fixing elements 31 and floating elements 51. The heat shrinkable tubes 21 are sleeved and fastened on an optical fiber 11 of the optical fiber measuring unit 10 and surrounded by the fixing elements 31. The floating elements 51 are detachably connected to lateral surfaces of the fixing element 31, and provide downward tensile force on the optical fiber 11. The optical fiber 11 has a sensing segment 111 for detection of change in tensile force applied to the optical fiber 11. The present invention is characterized in that the fixing element 31 and the floating elements 51 can be rapidly assembled with or detached from each other. Accordingly, the optical fiber sensing system 100 has benefits of shortened on-site construction time, recyclable components, and changeable device parameters.

Figure 2:
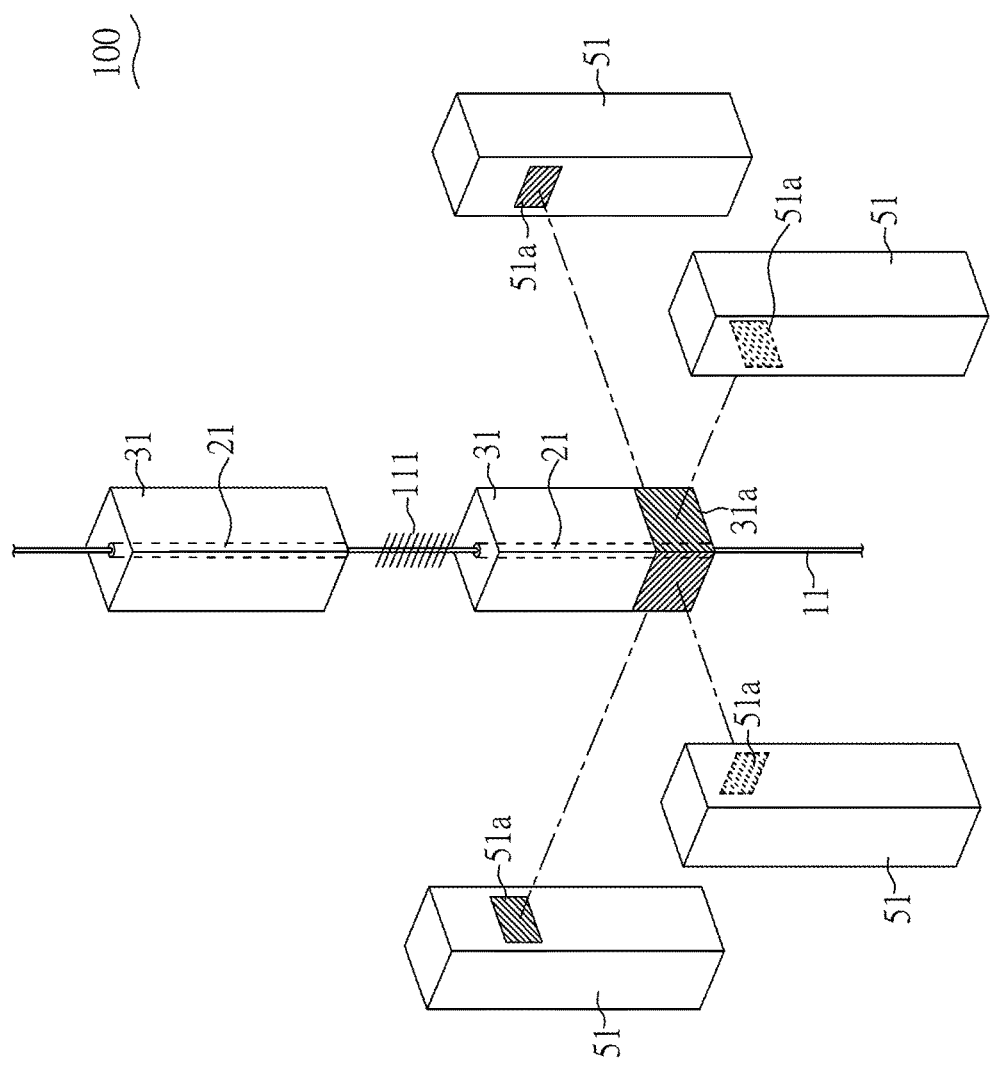
FIG. 2 is a partial exploded perspective view of an optical fiber sensing system in accordance with one embodiment of the present invention.

Attention is now directed to FIG. 2, which is a partial exploded perspective view of the optical fiber sensing device 100 for detailed illustration of all components of the optical fiber sensing device 100 and the relationship among the components. As shown in FIG. 2, the heat shrinkable tubes 21 are disposed at two ends of the sensing segment 111 of the optical fiber 11, and the fixing elements 31 are sleeved and fastened on the heat shrinkable tubes 21. The lateral surfaces of the fixing element 31 at the lower end of the sensing segment 111 are provided with a first connecting portion 31a, whereas each of the floating elements 51 has a second connecting portion 51a at its lateral surface. Accordingly, the floating elements 51 can be assembled on the fixing element 31 by coupling the first connecting portion 31a with the second connecting portion 51a so as to provide a predetermined tensile force on the lower end of the sensing segment 111. For exemplary purposes, the fixing elements 31 and the floating elements 51 are illustrated in cuboid configuration, and magnetic force is taken as an example for illustration of the bonding between the fixing element 31 and the floating elements 51. For instance, the four lateral surface of the fixing element 31 and one lateral surface of the floating element 51 can be provided with magnetic sheets as the first connecting portion 31a and the second connecting portion 51a, respectively. More specifically, the first connecting portion 31a of the fixing element 31 is a first magnetic portion, whereas the second connecting portion 51a of the floating element 51 is a second magnetic portion. Accordingly, in this embodiment, the first connecting portion 31a and the second connecting portion 51a can be associated with each other by magnetic attractive force, so that the floating elements 51 can be attracted on and fastened to the fixing element 31. Additionally, by applying an external force larger than the magnetic attractive force, the floating elements 51 can be detached from the fixing element 31.

Figure 3:
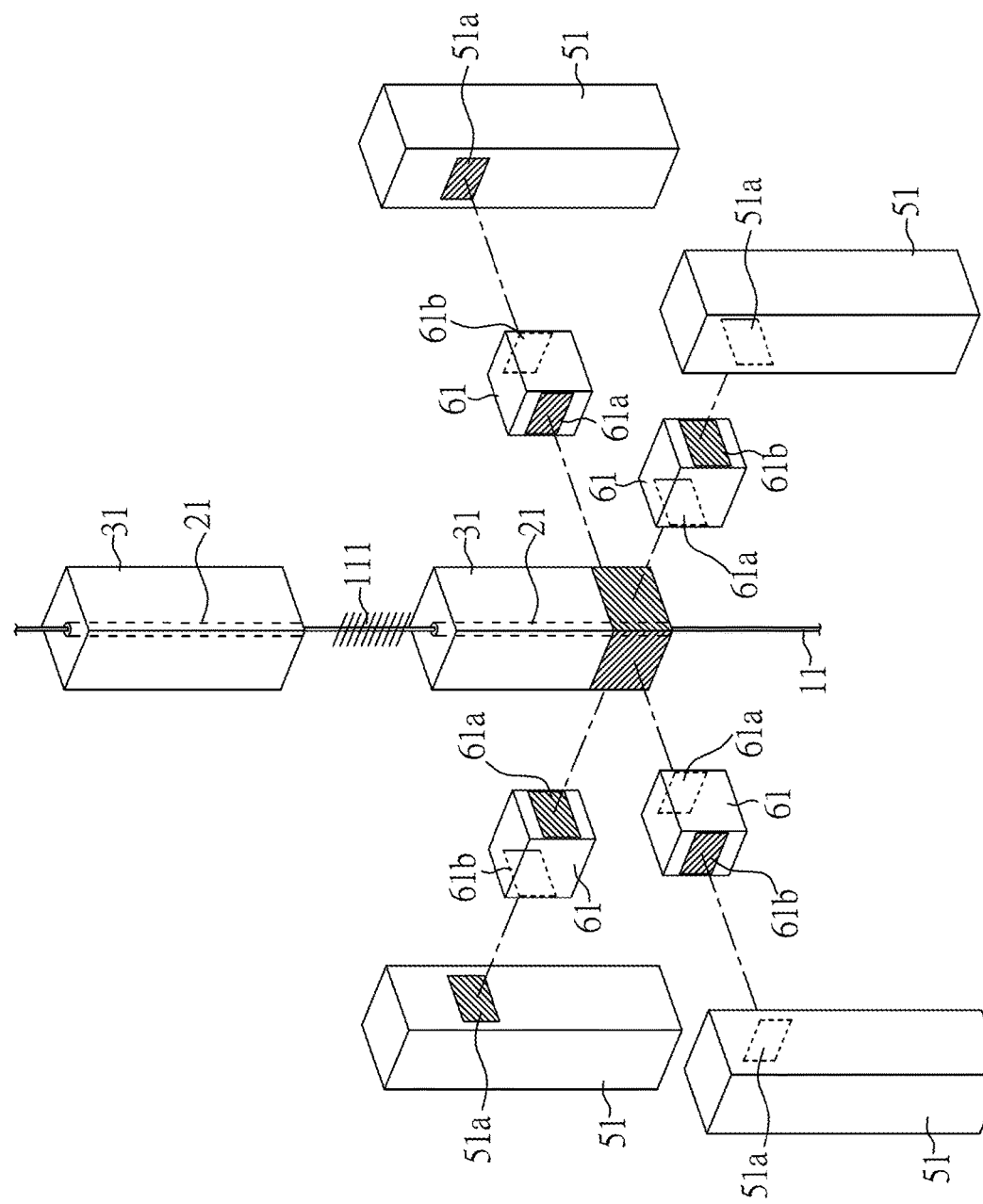
FIG. 3 is an exploded perspective view of the fixing element and the floating elements assembled with each other by another assembling manner in accordance with one embodiment of the present invention.
Figure 4:
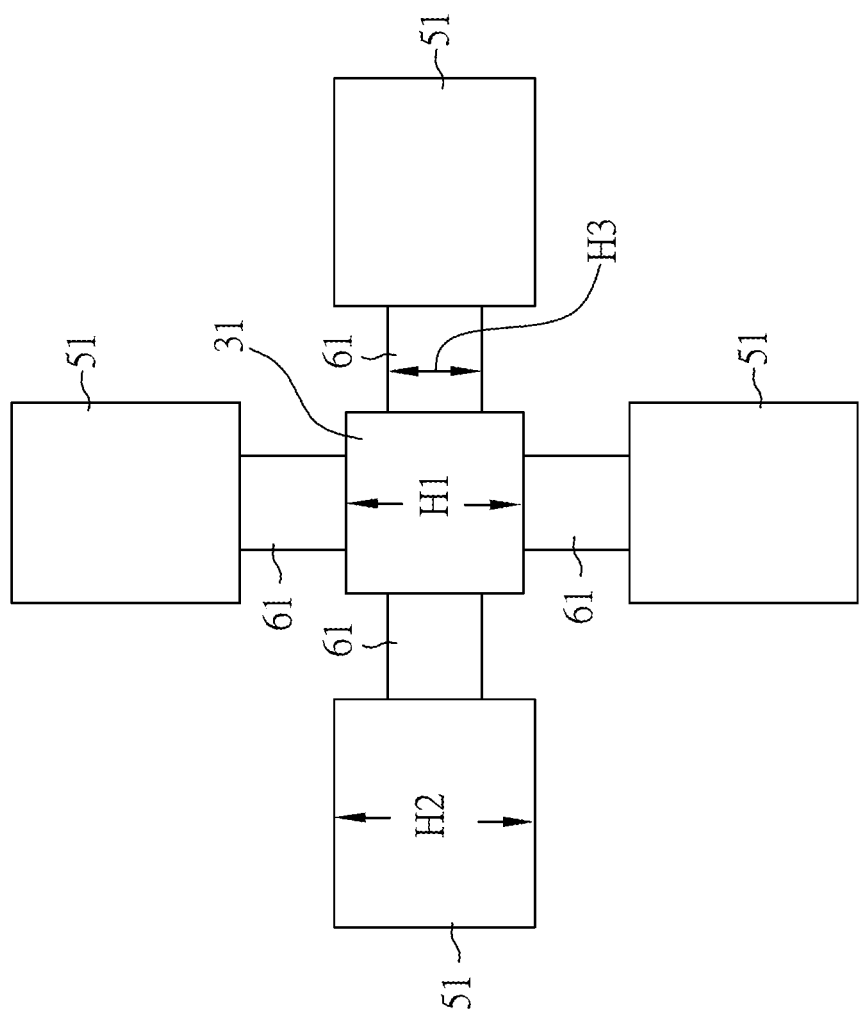
FIG. 4 is a bottom view of the fixing element and the floating elements assembled with each other by another assembling manner in accordance with one embodiment of the present invention.

Next, please refer to FIGS. 3 and 4, which are perspective and bottom views, respectively, of the fixing element 31 and the floating elements 51 associated with each other by another assembling manner. As shown in FIGS. 3 and 4, the floating elements 51 are detachably associated with the fixing element 31 by spacers 61. The opposite ends of each spacer 61 are connected with the fixing element 31 and the floating element 51, respectively. As a result, the fixing element 31 and the floating element 51 are spaced from each other by the spacer 61 so as to avoid the interference during assembling the floating elements 51 on the fixing element 31. In detail, as shown in FIG. 4, when the lateral width H2 of the floating element 51 is larger than the lateral width H1 of the fixing element 31, the four lateral surfaces of the fixing element 31 cannot be all associated with the floating elements 51 because the interference among the floating elements 51 would obstruct the assembly between the floating elements 51 and the fixing element 31. Accordingly, it is preferable to use the spacer 61 having smaller lateral width H3 (namely, the lateral width H3 of the spacer 61 is smaller than the lateral width H2 of the floating element 51, and smaller than or equal to the lateral width H1 of the fixing element 31) so as to avoid the assembling interference.

Please refer back to FIG. 3, which shows the detailed association among the fixing element 31, the floating elements 51 and the spacers 61. As shown in FIG. 3, the fixing element 31 and each of the floating elements 51 have a first connecting portion 31a and a second connecting portion 51a, respectively. Further, the opposite ends of each spacer 61 are provided with a third connecting portion 61a and a fourth connecting portion 61b. Accordingly, each of the spacers 61 can be detachably connected to the first connecting portion 31a of the fixing element 31 through the third connecting portion 61a, and the floating elements 51 can be detachably connected to the fourth connecting portions 61b of the spacers 61 through the second connecting portions 51a. For exemplary purposes, the fixing elements 31, the floating elements 51 and the spacers 61 are illustrated in cuboid configuration, and magnetic force is taken as an example for illustration of the bonding between the fixing element 31 and spacers 61 and between the floating elements 51 and the spacers 61. For instance, four lateral surfaces of the fixing element 31, one lateral surface of the floating element 51 and opposite sides of the spacer 61 can be provided with magnetic sheets as the first connecting portion 31a, the second connecting portion 51a, the third connecting portion 61a and the fourth connecting portion 61b, respectively. More specifically, the first connecting portion 31a of the fixing element 31 is a first magnetic portion; the second connecting portion 51a of the floating element 51 is a second magnetic portion; and the third connecting portion 61a and the fourth connecting portion 61b of the spacer 61 are a third magnetic portion 61a and a fourth magnetic portion 61b, respectively. Accordingly, in this embodiment, the attraction between the first connecting portion 31a and the third connecting portion 61a and between the second connecting portion 51a and the fourth connecting portion 61b can be provided by the magnetic force, so that the floating elements 51a can be attracted on and fastened to the fixing element 31 through the spacers 61.

Figure 5:
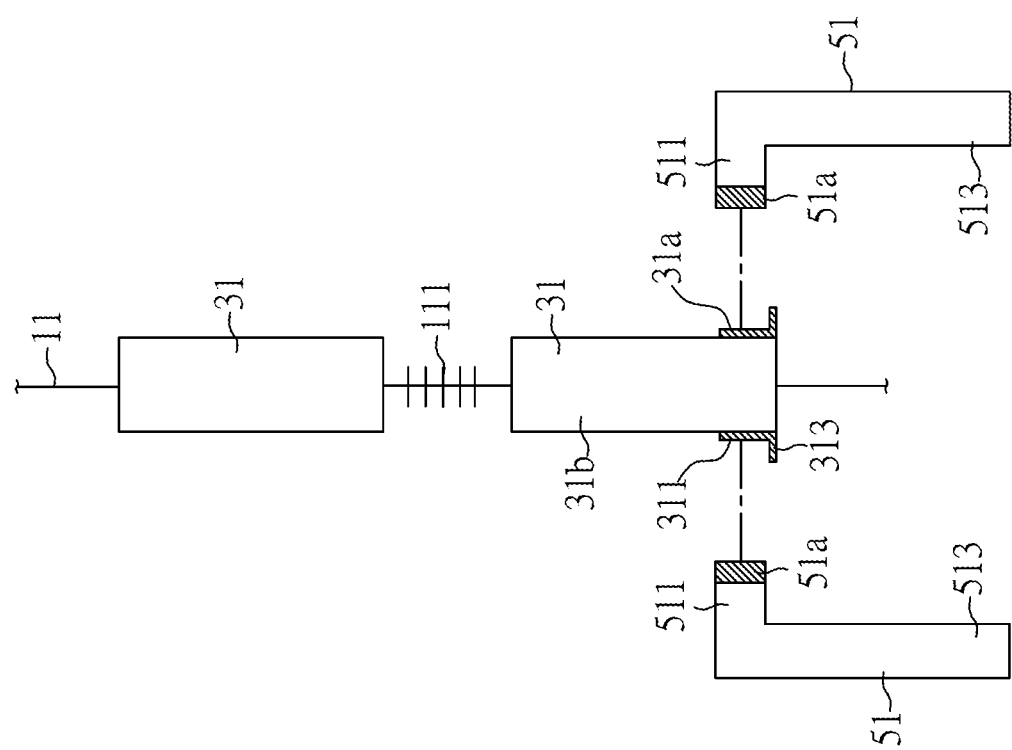
FIG. 5 is an exploded side view of the fixing element and another configuration of the floating elements assembled with each other in accordance with one embodiment of the present invention.
Figure 6:
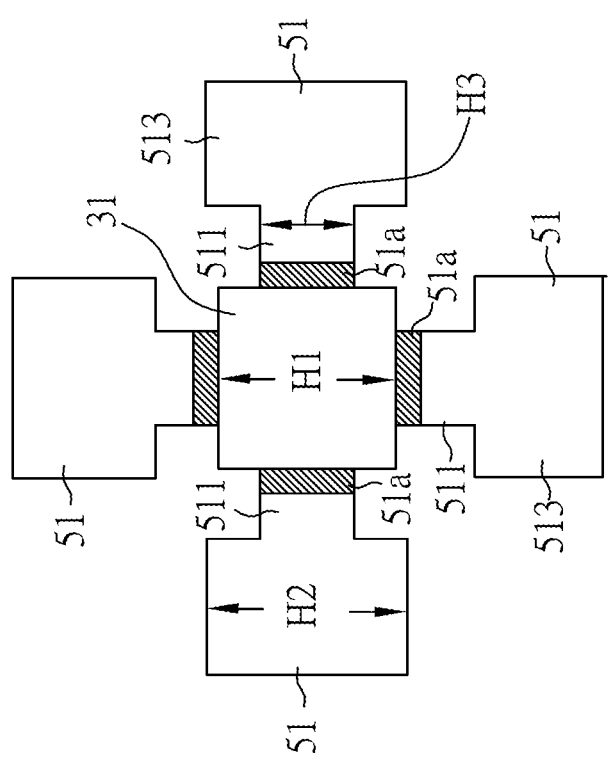
FIG. 6 is a bottom view of the fixing element and another configuration of the floating elements assembled with each other in accordance with one embodiment of the present invention.

The fixing elements 31 and the floating elements 51 are not limited to the cuboid configuration mentioned above for exemplary illustration, and may be designed into any other configuration easy for manufacture, assembly and disassembly according to requirement. Please refer to FIGS. 5 and 6, which are exploded side and bottom views, respectively, of the assembly of the fixing element 31 and another configuration of the floating elements 51. As shown in FIGS. 5 and 6, each of the floating elements 51 may be configured to have an L-shaped longitudinal cross section. In detail, the floating element 51 includes a bump 511 and a main body 513. The bump 511 projects from one lateral surface of the main body 513 and is integral with the main body 513. Further, one lateral surface of the bump 511 is provided with the second connecting portion 51a. As a result, the floating element 51 can be detachably associated with the first connecting portion 31a of the fixing element 31 through the second connecting portion 51a at the bump 511. On the other hand, the first connecting portion 31a at the four lateral surfaces of the fixing element 31 can have a vertical segment 311 and a horizontal segment 313. The vertical segment 311 can be integral with the horizontal segment 313 and disposed at the lateral surfaces of the body portion 31b of the fixing element 31. The horizontal segment 313 laterally projects outwardly from the vertical segment 311. For instance, an L-shaped magnetic sheet can be used as the first connecting portion 31a of the fixing element 31, and the bump 511 of the floating element 51 can be provided with a magnetic sheet as the second connecting portion 51a. Accordingly, when the floating elements 51 are assembled on the fixing element 31, the vertical segment 311 of the first connecting portion 31a and the lateral surface of the bump 511 can be detachably connected with each other, whereas the horizontal segment 313 supports the bottom of the bump 511. Preferably, the lateral width of the bump 511 of the floating element 51 is smaller than that of the main body 513 and smaller than or equal to that of the fixing element 31 so as to avoid interference during assembling the floating elements 51 on the fixing element 31. As shown in FIG. 6, in this embodiment, the lateral width H3 of the bump 511 of the floating element 51 is smaller than the lateral width H2 of the main body 513 and the lateral width H1 of the fixing element 31, namely H3<H2 and H3<H1.

Referring back to FIG. 1 for further illustration of the sensing mechanism of the optical fiber sensing system 100, when the floating elements 51 of the optical fiber sensing system 100 are placed into the fluid W with a selected portion of the optical fiber 11 between the upper and lower heat shrinkable tubes 21 vertically extending above the liquid surface of the fluid W, the floating elements 51 under buoyancy force of the fluid W can provide tensile force on the selected portion of the optical fiber 11, resulting in deformation of the selected portion of the optical fiber 11 along the length direction. For sensing the length deformation of the selected portion of the optical fiber 11, the sensing segment 111 of the optical fiber 11 is formed with a grating. Accordingly, the variation of the buoyancy of the fluid W acting on the floating elements 51 would cause the change in the tensile force applied on the sensing segment 111 and the variation in the grating period, resulting in the wavelength shift of the optical signal. Consequently, the deformation of the sensing segment 111 can be detected by monitoring the wavelength variation of the output optical signal.

Figure 7:
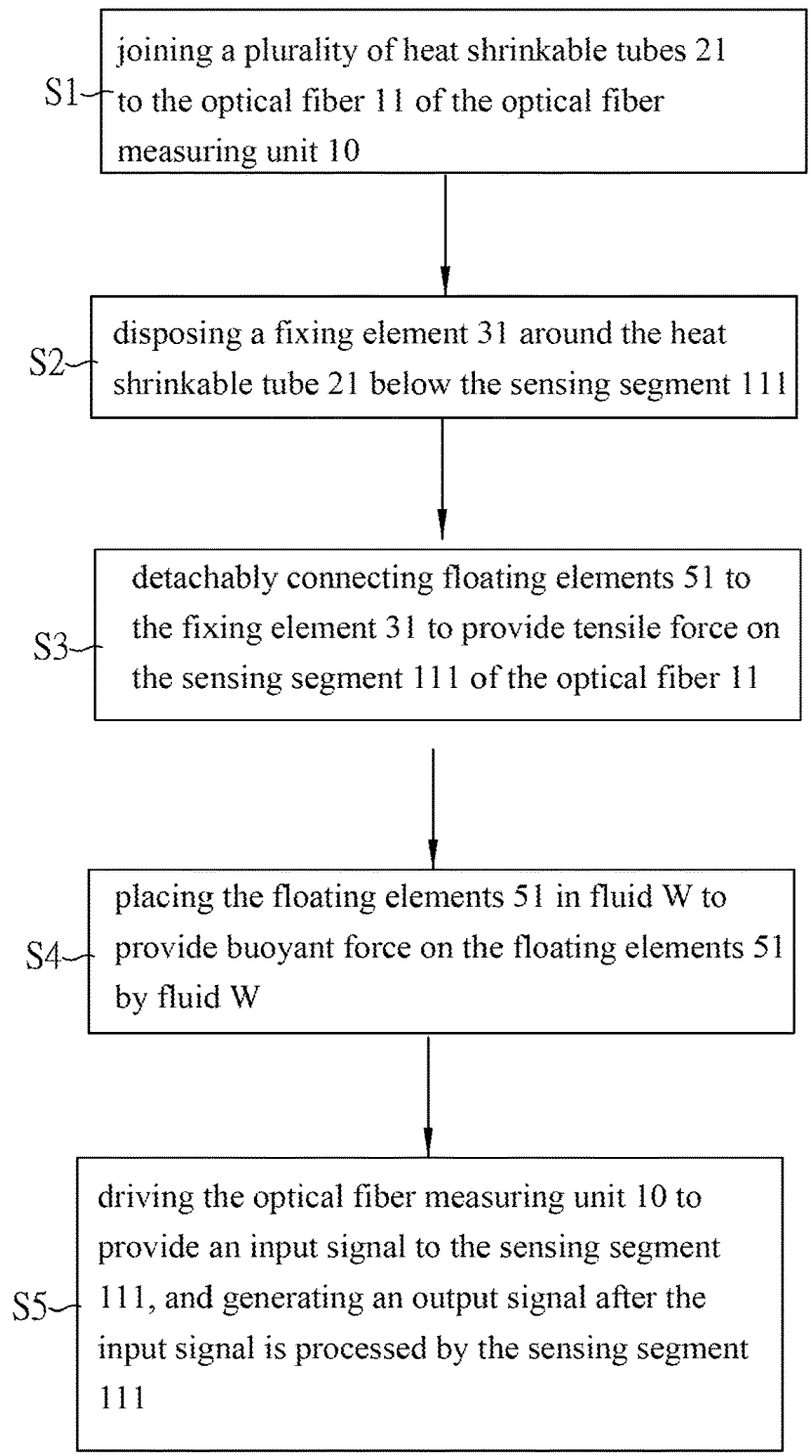
FIG. 7 is a flow chart of an optical fiber sensing method in accordance with one embodiment of the present invention.

Accordingly, as shown in the flow chart of FIG. 7, this embodiment further provides an optical fiber sensing method to detect the status of the tested subject by monitoring the change of the tensile force applied on the optical fiber. Please refer to the flow chart of FIG. 7 in conjunction with the perspective view, the partial exploded view and the partial bottom view of the optical fiber sensing system 100 as shown in FIGS. 1-6 for detailed illustration of the following steps.

Step S1: a plurality of heat shrinkable tubes 21 are sleeved and fastened on an optical fiber 11 of an optical fiber measuring unit 10. As mentioned above, the optical fiber 11 has a sensing segment 111, and the heat shrinkable tubes 21 are joined to the optical fiber 11 from the upper and lower ends of the sensing segment 111, respectively.

Step S2: a fixing element 31 is sleeved and fastened on the heat shrinkable tube 21 below the sensing segment 111. In the optical fiber sensing system 100 of FIGS. 1-6 for exemplary illustration, each of the upper and lower heat shrinkable tubes 21 is associated with a fixing element 31, and each of the four lateral surfaces of the lower fixing element 31 is coupled with a floating element 51. As the fixing element 31 is used for coupling with the floating elements 51, it is feasible to couple the fixing element 31 only on the heat shrinkable tube 21 below the sensing segment 111.

Step S3: the floating elements 51 are detachably connected to the fixing element 31 so that the floating elements 51 can provide tensile force on the sensing segment 111 of the optical fiber 11. In the optical fiber sensing system 100 of FIGS. 1-6, the floating elements 51 are assembled on the fixing element 31 by magnetic attractive force. However, the assembling manner between the fixing element 31 and the floating elements 51 is not limited to the aforementioned magnetic attraction. For instance, the first connecting portion 31a of the fixing element 31, the second connecting portion 51a of the floating element 51, and the third connecting portion 61a and the fourth connecting portion 61b of the spacer 61 may be configured to be engaged with each other. As a result, the floating elements 51 can directly or indirectly assembled on the lateral surfaces of the fixing element 31 through detachable engagement. The quantity of the floating elements 51 is not limited to that illustrated in this embodiment, and may be modified according to requirement. Particularly, as the fixing element 31 and the floating elements 51 are designed for easy assembly/disassembly, the design parameters can be varied by altering the quantity or specification of the floating elements 51 according to the condition of the monitored subject in practical application.

Step S4: the floating elements 51 are placed into a fluid W to be forced by buoyant of the fluid W. As mentioned above, when the buoyant force applied on the floating elements 51 changes, the grating period would increase or decrease with the variation of the tensile force on the optical fiber 11. Accordingly, when the movement of the monitored subject induces variation of the buoyant force applied on the floating elements 51, the condition change of the monitored subject can be detected based on the variation of the grating period.

Step S5: the optical fiber measuring unit 10 is driven to provide an input signal to the sensing segment 111 and an output signal is generated after the input signal is processed by the sensing segment 111. As shown in FIG. 1, the optical fiber 11 is coupled with an optical module 13, and the optical module 13 is further coupled with a signal processing module 15. When the optical fiber measuring unit 10 is driven, the optical module 13 would emit an input signal into the optical fiber 11, and then an output signal is generated and transmitted to the optical module 13 after the input signal is processed by the sensing segment 111. Subsequently, the physical parameters regarding the condition of the monitored subject can be determined by analyzing the output signal through the signal processing module 15. Accordingly, when the change of the tensile force leads to decrease or increase in the grating period, the variation of the output signal can be observed so as to determine the condition of the monitored subject by analyzing the output signal. Further, after completing the monitoring, the optical fiber 11 can be cut, and the floating elements 51 can be detached from the fixing element 31 so as to recycle these sensing components. Accordingly, in the next monitoring procedure, the recycled fixing element 31 can be assembled with new floating elements of different sizes to match the requirements for the new monitoring procedure. More specifically, in the next monitoring procedure, these recycled sensing components can be directly utilized to repeat the above steps S3 to S5.

Figure 8:
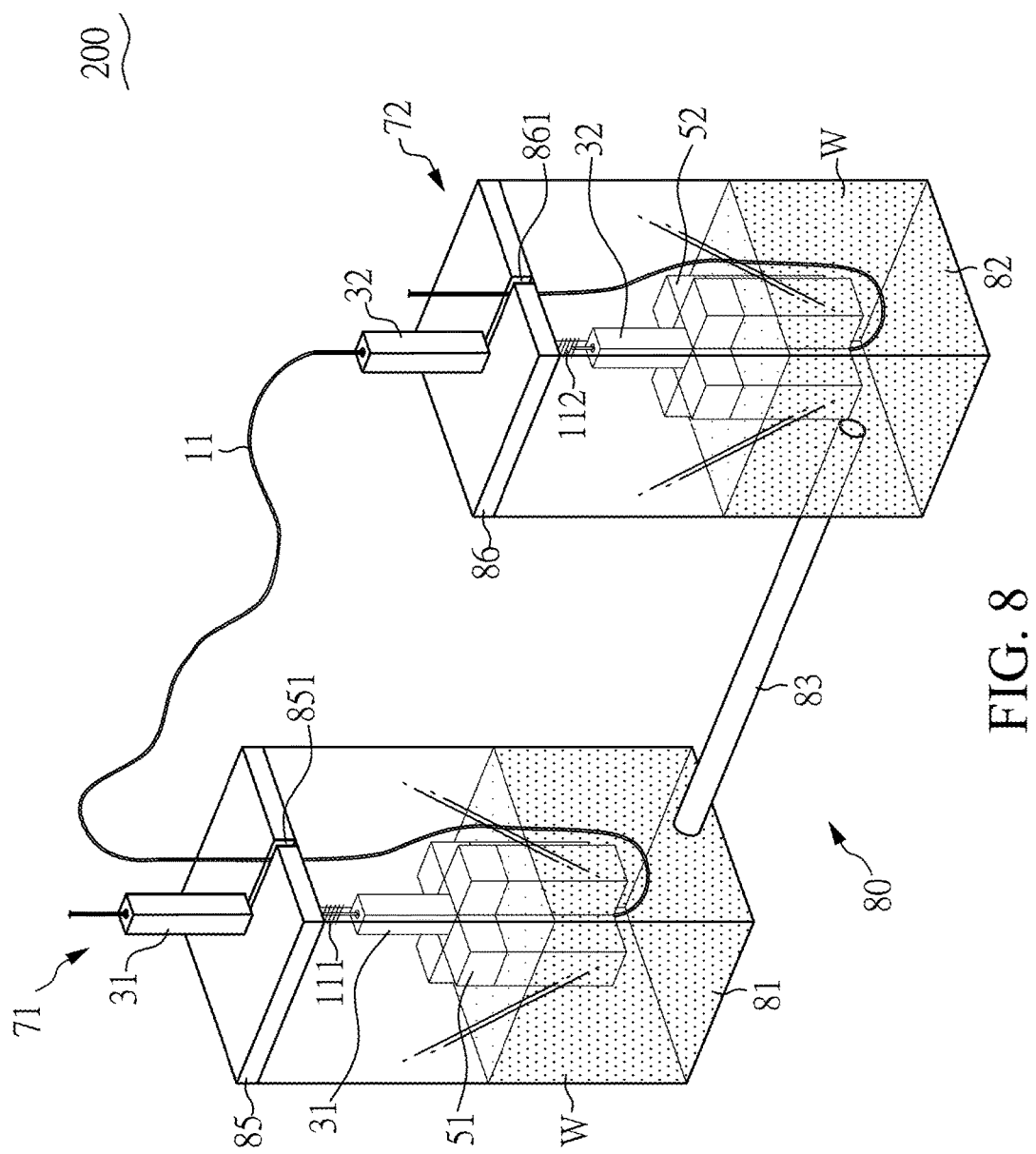
FIG. 8 is a perspective view of an optical fiber sensing system in accordance with another embodiment of the present invention.
Figure 9:
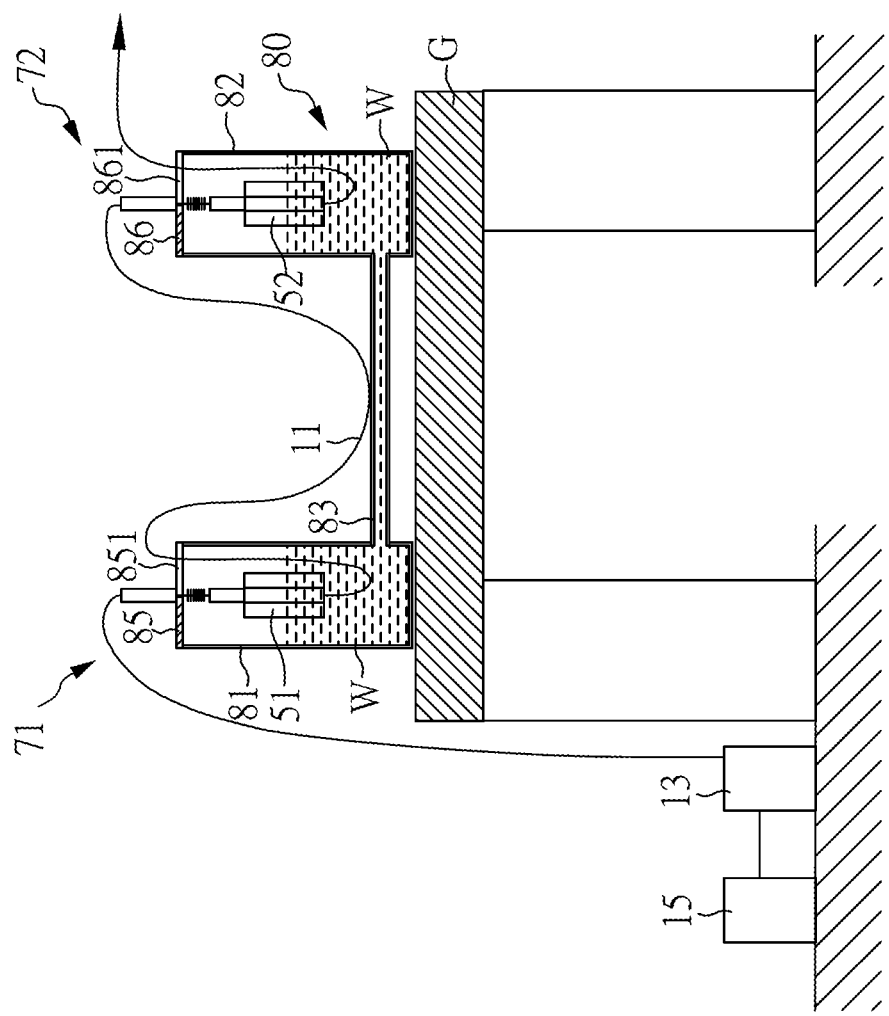
FIG. 9 is a schematic view of an optical fiber sensing system installed on a subject to be monitored in accordance with another embodiment of the present invention.

As a result, the aforementioned optical fiber sensing method can be applied in monitoring, for example, the inclination or settlement of the subject such as bridges, buildings or roads. Please refer to FIGS. 8 and 9, which are a perspective view of the optical fiber sensing system 200 for monitoring inclination or settlement of the tested subject and a schematic view for illustrating the optical fiber sensing system 200 installed on the monitored subject G. As shown in FIGS. 8 and 9, the optical fiber sensing system 200 has a container 80 disposed on the monitored subject G and the fluid W is accommodated in the container 80. In this illustration, the optical fiber 11 of the optical fiber sensing system 200 has a plurality of sensing segments 111, 112. Each of the sensing segments 111, 112 is combined with the heat shrinkable tubes (not shown in the figure), the fixing element 31, 32 and the floating elements 51, 52 to constitute a sensing module 71, 72. The association among the components of each sensing module 71, 72 has been illustrated in FIGS. 2-5 and thus not be described again here.

Figure 10:
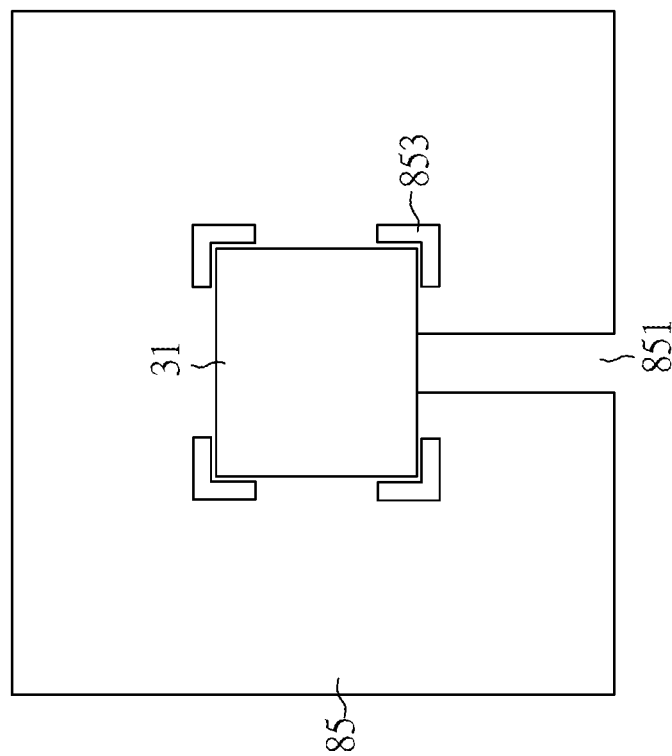
FIG. 10 is a top view of the fixing element disposed on the covering plate in accordance with another embodiment of the present invention.
Figure 11:
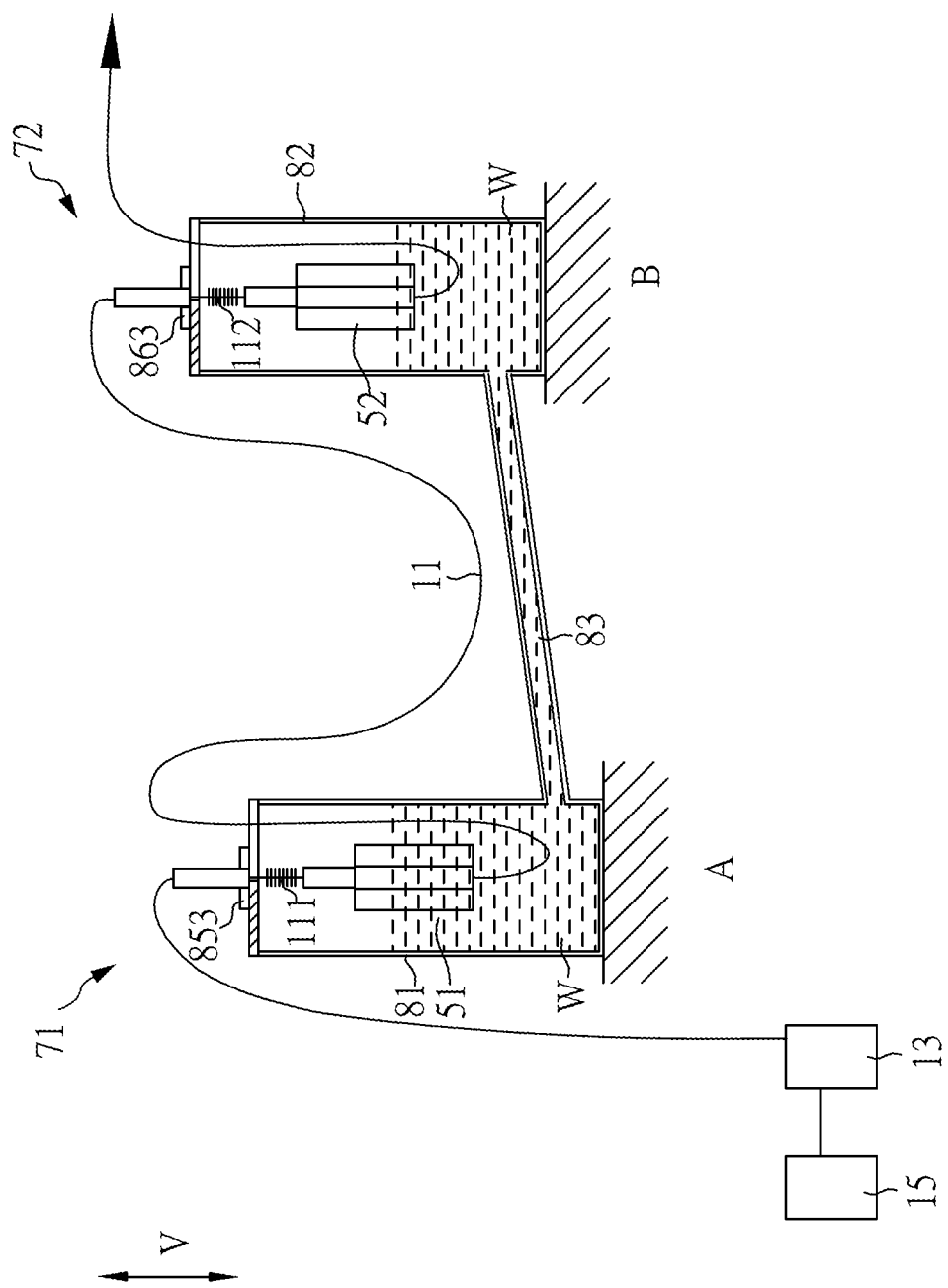
FIG. 11 is a schematic view of an optical fiber sensing system used in detecting settlement condition in accordance with another embodiment of the present invention.

More specifically, the container 80 has a plurality of accommodating portions 81, 82 and a connecting pipe 83. The accommodating portions 81, 82 of the container 80 can communicate with each other through the connecting pipe 83. Accordingly, the liquid levels of the fluid W in the accommodating portions 81, 82 can be maintained at the same level based on communicating pipe principle, and the fluid W in the accommodating portion 81, 82 would affect its corresponding sensing module 71, 72. Additionally, as shown in FIG. 8, the container 80 further includes covering plates 85, 86 to cover the top openings of the accommodating portions 81, 82, respectively. As the covering plates 85, 86 have trenches 851, 861, respectively, the optical fiber 11 can extend into the accommodating portions 81, 82 through the trenches 851, 861. Furthermore, the upper fixing elements 31, 32 above the sensing segments 111, 112 are disposed across the trenches 851, 861 of the covering plates 85, 86. As another aspect, please referring to FIG. 10, which is a top view for illustrating the upper fixing element 31 affixed on the covering plate 85, the covering plate 85 may further have a limiting structure 853, which conforms to four sides of the upper fixing element 31 and defines a placement area. As a result, when the upper fixing element 31 is disposed across the trench 851 of the covering plate 85, the upper fixing element 31 can be confined at the placement area. Likewise, the other covering plate 86 may also have a limiting structure 863 (as shown in FIG. 11), and the same description need not be repeated. The limiting structure 853 is not particularly limited and can be configured into any structure for preventing displacement of the upper fixing element 31. In this embodiment, the limiting structure 853 is illustrated as an L-shaped protrusion only for exemplary purpose.

Next, please refer to FIG. 11 for explanation of the mechanism for sensing relative displacement between the accommodating portions 81, 82 in the vertical directions V. When the left area A of the monitored subject sinks (or the monitored subject inclines to the left) to cause the change in difference of elevation between the accommodating portions 81, 82, the fluid W in the accommodating portion 82 disposed on the right area B will flow into the accommodating portion 81 disposed on left area A based on communicating pipe principle for maintaining the surfaces of the fluid W in the two accommodating portions 81, 82 in the same liquid level. As a result, the liquid surface of the fluid W in the accommodating portion 81 rises, and the buoyant force applied to the corresponding floating elements 51 increases, resulting in reduction of the tensile force on the corresponding sensing segment 111. On the contrary, as the liquid surface of the fluid W in the other accommodating portion 82 drops, the buoyant force applied to the corresponding floating elements 52 decreases, resulting in increase of the tensile force on the corresponding sensing segment 112. Accordingly, when the settlement or inclination of the monitored subject induces the change in the grating period of the sensing segments 111, 112, the variation of the reflected optical signal (i.e. output signal) received by the optical module 13 can be observed. Because the received output signals depend on the settlement or inclination degree between the accommodating portions 81, 82, the surface settlement or inclination of the monitored subject can be detected by converting the output signals into physical parameters regarding the settlement or inclination degree (such as angle of inclination or depth of settlement) through the signal processing module 15.

In practical application, the quantities of the sensing modules and the accommodating portions are not limited to those illustrated in this embodiment. For instance, the quantities of the sensing modules, the accommodating portions and the connecting pipes may be N, N and (N−1) (N≥2), respectively, in which each of the accommodating portions corresponds to one sensing module, and the opposite ends of each connecting pipe respectively connect with different accommodating portions corresponding to different sensing modules.

Although the present invention has been explained in relation to its preferred embodiment, it is to be understood that many other possible modifications and variations can be made without departing from the spirit and scope of the invention as hereinafter claimed.

What is claimed is:

1. An optical fiber sensing method, comprising:
providing an optical fiber measuring unit, a plurality of heat shrinkable tubes and at least one fixing element, wherein (i) the heat shrinkable tubes are fastened on an optical fiber of the optical fiber measuring unit, (ii) the optical fiber has at least one sensing segment, (iii) the heat shrinkable tubes are fastened at an upper end and a lower end of the at least one sensing segment, respectively, and (iv) the at least one fixing element is sleeved and fastened on the heat shrinkable tube at the lower end of the at least one sensing segment;
detachably connecting at least one floating element to the at least one fixing element, so that the at least one floating element provides tensile force on the at least one sensing segment of the optical fiber, wherein the at least one floating element includes a bump and a main body, and the bump protrudes from a lateral surface of the main body and is integral with the main body and is detachably connected to the at least one fixing element, therewith the at least one fixing element and the main body being located at opposite sides of the bump;
placing the at least one floating element into a fluid, so that the fluid provides buoyant force on the at least one floating element; and
driving the optical fiber measuring unit to provide an input signal to the at least one sensing segment and generating an output signal after the input signal is processed by the at least one sensing segment, wherein the tensile force applied to the at least one sensing segment changes with variation of the buoyant force on the at least one floating element, resulting in change of the output signal.

2. The optical fiber sensing method of claim 1, wherein the at least one fixing element has a first connecting portion, and the at least one floating element has a second connecting portion and is detachably connected to the first connecting portion of the at least one fixing element through the second connecting portion.

3. The optical fiber sensing method of claim 2, wherein the first connecting portion and the second connecting portion are coupled to each other by magnetic force.

4. The optical fiber sensing method of claim 1, wherein the at least one fixing element has a first connecting portion, and the bump of the at least one floating element has a second connecting portion and is detachably connected to the first connecting portion of the at least one fixing element through the second connecting portion.

5. The optical fiber sensing method of claim 4, wherein (i) the first connecting portion of the at least one fixing element has a vertical segment and a horizontal segment, (ii) the vertical segment is detachably connected to a lateral surface of the bump, and (iii) the horizontal segment laterally projects from the vertical segment and supports a bottom surface of the bump.

6. The optical fiber sensing method of claim 1, wherein the at least one floating element is detachably connected to the at least one fixing element through a spacer.

7. The optical fiber sensing method of claim 6, wherein (i) the at least one fixing element has a first connecting portion, (ii) the at least one floating element has a second connecting portion, (iii) the spacer has a third connecting portion and a fourth connecting portion at opposite sides thereof, respectively, (iv) the spacer is detachably connected to the first connecting portion of the at least one fixing element through the third connecting portion, and (v) the at least one floating element is detachably connected to the fourth connecting portion of the spacer through the second connecting portion.

8. The optical fiber sensing method of claim 7, wherein the first connecting portion and the third connecting portion are coupled to each other by magnetic force, and the second connecting portion and the fourth connecting portion are coupled to each other by magnetic force.

9. The optical fiber sensing method of claim 1, wherein (i) the fluid is accommodated in a container, (ii) the container is installed to a subject to be monitored, and (iii) the output signal changes when the movement of the subject to be monitored induces variation of the tensile force applied to the at least one sensing segment.

10. The optical fiber sensing method of claim 9, wherein (i) the at least one sensing segment is a plurality of sensing segments, (ii) the container has a plurality of accommodating portions and at least one connecting piper, (ii) the accommodating portions communicate with each other through the at least one connecting pipe, so that the fluid in the accommodating portions keeps the same liquid level based on communicating pipe principle, and (iii) the fluid in each of the accommodating portions affects the corresponding one of the at least one floating element and the corresponding one of the sensing segments.

11. The optical fiber sensing method of claim 10, wherein the output signal changes when inclination or settlement occurs in a surface of the subject to be monitored.

12. The optical fiber sensing method of claim 10, wherein (i) an additional fixing element is sleeved and fastened on the heat shrinkable tube at the upper end of each of the sensing segments, (ii) the container further has a plurality of covering plates to seal a top opening of each of the accommodating portions, and (iii) each of the covering plates has a limiting structure conforming to four lateral sides of the additional fixing element.

13. The optical fiber sensing method of claim 1, wherein the at least one sensing segment has a grating, and the period of the grating changes with variation of the tensile force applied to the optical fiber by the at least one floating element.

* * * * *